(12) United States Patent
Larcheveque et al.

(10) Patent No.: US 7,386,558 B2
(45) Date of Patent: Jun. 10, 2008

(54) METHODS AND SYSTEMS FOR FILTERING AN EXTENSIBLE APPLICATION MARKUP LANGUAGE (XAML) FILE TO FACILITATE INDEXING OF THE LOGICAL CONTENT CONTAINED THEREIN

(75) Inventors: Jean-Marie H. Larcheveque, Redmond, WA (US); Andrey Shur, Redmond, WA (US); Young Gah Kim, Bothell, WA (US); David C. Brown, Redmond, WA (US); Mikhail V. Leonov, Seattle, WA (US); Robert A. Relyea, Bellevue, WA (US); Zhenbin Xu, Sammamish, WA (US); Jerry J. Dunietz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 11/112,601

(22) Filed: Apr. 22, 2005

(65) Prior Publication Data

US 2006/0242166 A1    Oct. 26, 2006

(51) Int. Cl.
*G06F 7/00* (2006.01)

(52) U.S. Cl. .................................................... 707/100
(58) Field of Classification Search ................. 707/100
See application file for complete search history.

(56) References Cited

U.S. PATENT DOCUMENTS

| 2004/0230900 | A1* | 11/2004 | Reylea et al. ............... 715/513 |
| 2005/0091575 | A1* | 4/2005 | Relyea et al. ............... 715/503 |
| 2005/0091576 | A1* | 4/2005 | Relyea et al. ............... 715/502 |
| 2005/0108628 | A1* | 5/2005 | Grambihler et al. ........ 715/513 |
| 2005/0273704 | A1* | 12/2005 | Dunietz et al. ............. 715/513 |

* cited by examiner

*Primary Examiner*—Cheyne D Ly
(74) *Attorney, Agent, or Firm*—Shook, Hardy & Bacon L.L.P.

(57) ABSTRACT

Methods for filtering a file written in Extensible Application Markup Language (XAML) and incrementally returning the logical content contained therein to the environment, e.g., a search engine, are provided. Additionally provided are methods for extracting logical content contained in a XAML file to facilitate searching and/or indexing thereof. The methods provided permit the filtering of files containing only flow-format elements, files containing only elements representing fixed-format pages, and/or files containing both flow-format and elements representing fixed-format pages.

1 Claim, 3 Drawing Sheets

METHODS AND SYSTEMS FOR FILTERING AN EXTENSIBLE APPLICATION MARKUP LANGUAGE (XAML) FILE TO FACILITATE INDEXING OF THE LOGICAL CONTENT CONTAINED THEREIN

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates to computing environments. More particularly, embodiments of the present invention relate to methods and systems for filtering a file written in Extensible Application Markup Language (XAML) and incrementally returning the indexable logical content contained therein to the environment, e.g., a search engine. More particularly, embodiments of the present invention relate to methods and systems for extracting indexable logical content contained in a XAML file to facilitate searching and/or indexing thereof.

BACKGROUND OF THE INVENTION

Extensible Application Markup Language (XAML) is a particular Extensible Markup Language (XML) schema that defines the layout and behavior of interactive files similar in functionality to dynamic Hyper Text Markup Language (HTML) files. Searching for files or building search indices for files involves extracting the indexable logical contents, i.e., the textual contents, of the file. Extracting the indexable logical content from an XAML file involves filtering out all formatting and behavior data therefrom.

Files written in XAML cannot be suitably filtered for indexing and/or searching of the indexable logical content contained therein as an arbitrary XML file because such filtering methods do not take into account the markup semantics. Markup semantics include information regarding whether a particular instance of text content or a particular attribute value is to be treated as indexable content rather than non-content (e.g., structural information). Filtering out element and attribute names, for example, and treating all attribute values and text data as content, as a conventional generic XML filter would do, would result in metadata (non-content) being improperly returned as data.

Accordingly, a method for filtering a file written in XAML that accounts for markup semantics and processes elements and attributes would be desirable for accurately determining the content of the file for searching and indexing applications, or any application that needs to specifically process the content of the file.

BRIEF SUMMARY OF THE INVENTION

Embodiments of the present invention relate to methods and systems for filtering an Extensible Application Markup Language (XAML) file to facilitate indexing of indexable logical content contained therein. In one embodiment, the method includes recognizing an element in the XAML file, determining through analysis of the Common Language Runtime (CLR) class associated with the element if the element contains indexable logical content and, if it is determined that the element contains indexable logical content, locating this content in an attribute value or character data pertaining to the element, and extracting this content to facilitate indexing thereof.

Further embodiments of the present invention relate to methods for extracting indexable logical content contained in a XAML file to facilitate indexing thereof. In one embodiment, the method includes identifying a user-defined format element in the XAML file, the user-defined format element having code associated therewith, analyzing the code associated with the user-defined format element to determine a Common Language Runtime (CLR) class therefore, and determining if the user-defined format element contains indexable logical content based upon the CLR class determined. If the user-defined format element contains indexable logical content, the method may further include locating the indexable logical content in an attribute value or character data pertaining to the user-defined format element and extracting the located indexable logical content to facilitate indexing thereof.

In another embodiment, the method includes recognizing an element representing a fixed-format page in the XAML file, conducting an adjacency analysis of one or more glyph runs present in the element to determine information regarding distance and colinearity there between, and taking into account language-dependent information to translate the distance and colinearity information into word-breaking and paragraph-breaking information to facilitate indexing thereof.

Additionally, embodiments of the present invention relate to computer-readable media having computer-executable instructions for performing the methods disclosed herein, as well as to computers programmed to perform the disclosed methods.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention provides methods for filtering a file written in Extensible Application Markup Language (XAML) and incrementally returning the indexable logical content, i.e., the textual content, contained therein to the environment, e.g., a search engine. More particularly, embodiments of the present invention relate to methods for extracting indexable logical content contained in an XAML file to facilitate searching and/or indexing thereof. The methods disclosed herein permit the filtering of files containing only flow-format elements (that is, known and/or user-defined elements), files containing only elements representing a fixed-format page (e.g., glyph runs), and/or files containing both flow-format elements and elements representing one or more fixed-format pages.

Having briefly described an overview of the present invention, an exemplary operating environment for the present invention is described below.

Figure 1:
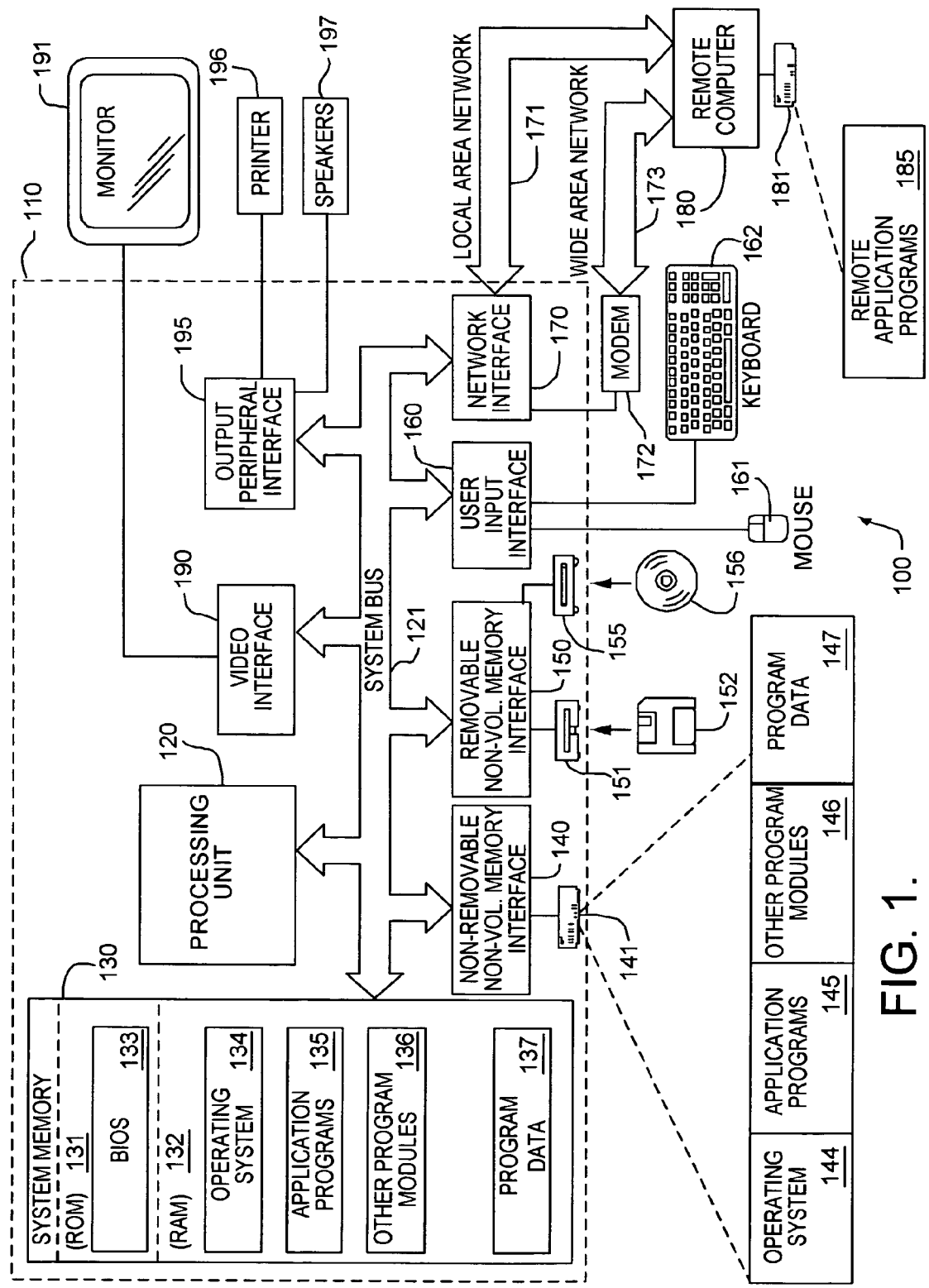
FIG. 1 is a block diagram of an exemplary computing environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

As previously mentioned, embodiments of present invention relate to methods for filtering files written in Extensible Application Markup Language (XAML) to facilitate indexing and/or searching of logical content contained therein. Thus, the methods herein described provide for the filtering of an XAML file to leave aside anything that is non-content (e.g., structural information) and extract only the data, the textual content itself, for indexing and/or searching.

Figure 2:
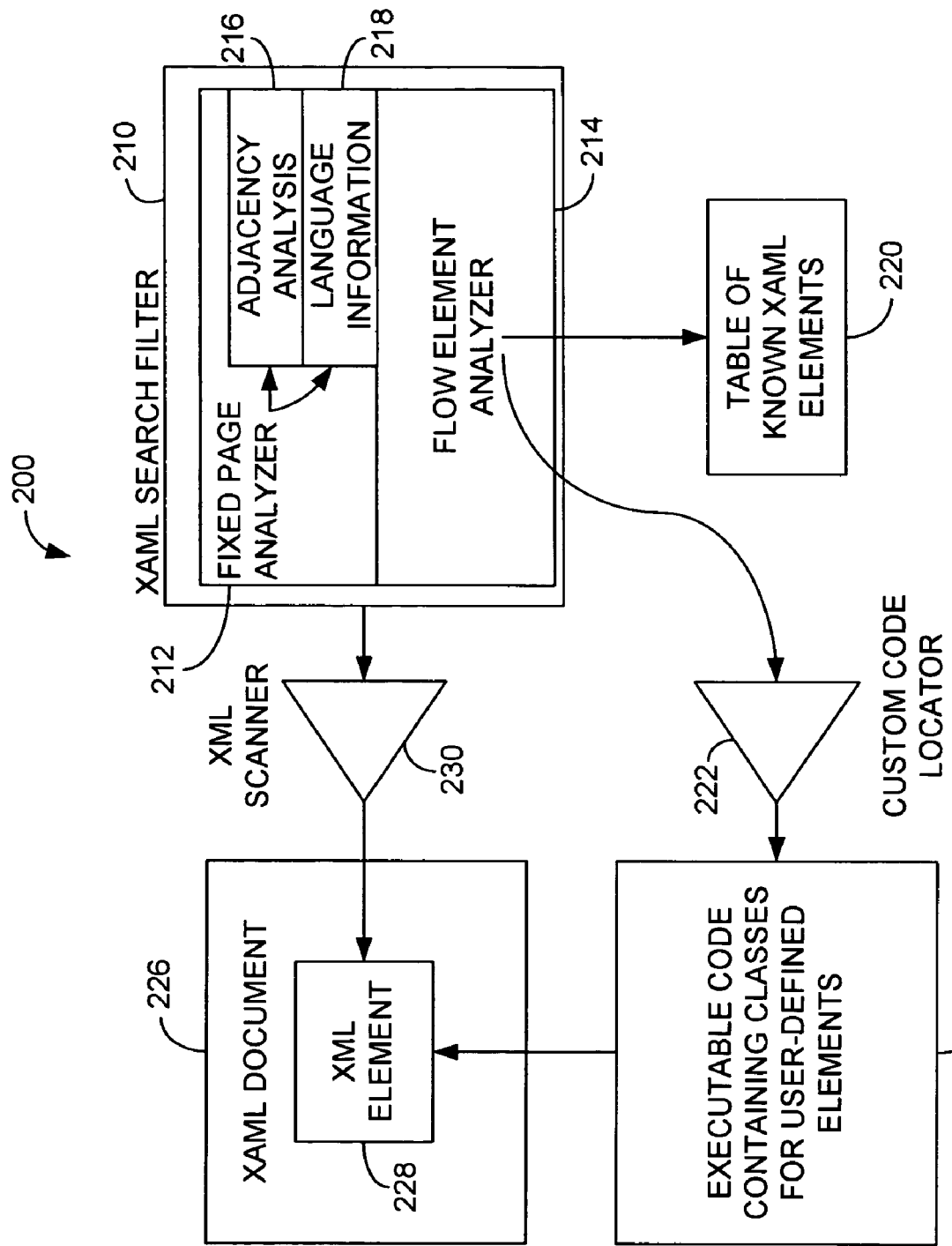
FIG. 2 is a block diagram showing a system architecture in accordance with an embodiment of the present invention wherein the flow of data elements is illustrated from an Extensible Application Markup Language (XAML) filter through rendering of the element in an XAML document.

Turning to the drawing figures in general, and initially to FIG. 2 in particular, a block diagram is illustrated which shows an exemplary system architecture in accordance with an embodiment of the present invention, the system architecture being designated generally as reference numeral 200. The system architecture illustrates the flow of data elements from an XAML search filter 210 through rendering of the element 228 in a XAML document 226, as more fully described below. It should be noted that the arrows shown in FIG. 2 do not represent data flow but represent dependencies, i.e., client-to-service relationships. In particular, all data flows from the document through the scanner 230, but the arrows point "backward" as the XAML search filter 210 uses the scanner 230 to access the document.

An element may either be a flow-format element (whether known or user-defined) or an element representing a fixed-format page, the difference there between referring to the way in which the element is rendered upon being read by the system. In flow-format, the layout is allowed to vary with the dimensions of the viewing medium. flow-formatflow-formatFor instance, the number of columns contained therein may be adjusted to appropriately fit the size of the window. The logical content of a particular flow-format element type (e.g., Paragraph or Italic) can be located at a specific path or set of paths in the XML structure starting from this element, and can be characterized as either block (i.e., forming a paragraph) or inline (i.e., forming a string of characters un-separated from the surrounding context).

In elements representing fixed-format pages, however, the positioning of the graphic and textual constituents of a page is indicated using absolute measurements. This makes for a radically simpler XAML sublanguage, with just one element type hosting textual content, the glyph run. flow-format Elements representing fixed-format pages and flow-format elements present different challenges from a filtering perspective. Accordingly, whether the element represents a fixed-format page or is flow-format determines the way in which the logical content contained therein will be filtered.

If an element identified in document 226 by the XAML scanner 230 is recognized as an element representing a fixed-format page, the element may be analyzed using a fixed page analyzer 212. Analysis using a fixed page analyzer 212 includes both adjacency analysis (as indicated at block 216) and factoring in of language-dependent information and the like (as indicated at block 218). Each of these analyses are more fully discussed below with reference to FIG. 3.

As will be understood and appreciated by those of ordinary skill in the art, XAML elements are associated with a Custom Language Runtime (CLR) class in the managed assembly that defines XAML. This CLR class or object-oriented class, is executed when an element (e.g., a paragraph element) is to be rendered. XAML object-oriented classes also include associated self-descriptive information (i.e., class attributes) that may be used upon implementation of the method of the present invention, as more fully described below.

A "managed assembly", as the term is used herein, is a code file that may be executed in the .Net framework and whose object-oriented constituents may be examined using a form of code analysis known to those of ordinary skill in the art as "reflection". "Reflection" refers to the possibility of extracting type information from executable code (including class definitions). In the CLR, type information includes attributes, i.e., sets of property-value pairs attached to types, functions, or other entities. These attributes may be defined by a user (programmer) for the sole purpose of providing information on the code's semantics through reflection. Thus, if each XAML class has its content information described in class attributes, it is possible to use reflection to extract this information, as more fully described below.

If a given element is identified as a flow-format element, whether known or user-defined, the element may be analyzed using a flow element analyzer 214. If the identified flow element is a known element, that is, an element for which information pertaining to the semantics thereof is well-defined, the flow element analyzer 214 may access such information from the managed assembly that defines XAML. This is indicated at block 220. Once such information is accessed, the logical content of the element may be forwarded to an XML scanner 230 and the element 228 may subsequently be rendered in the XAML document 226.

If, however, the identified flow element is a user-defined element for which information pertaining to the semantics thereof is defined only in the customized code thereof, the flow element analyzer 214 may access such information using a custom code locator 222. Once the custom code is identified, the executable code containing the CLR class for the user-defined element may be identified (as indicated at block 224) prior to rendering the element 228 in the XAML document 226.

Figure 3:
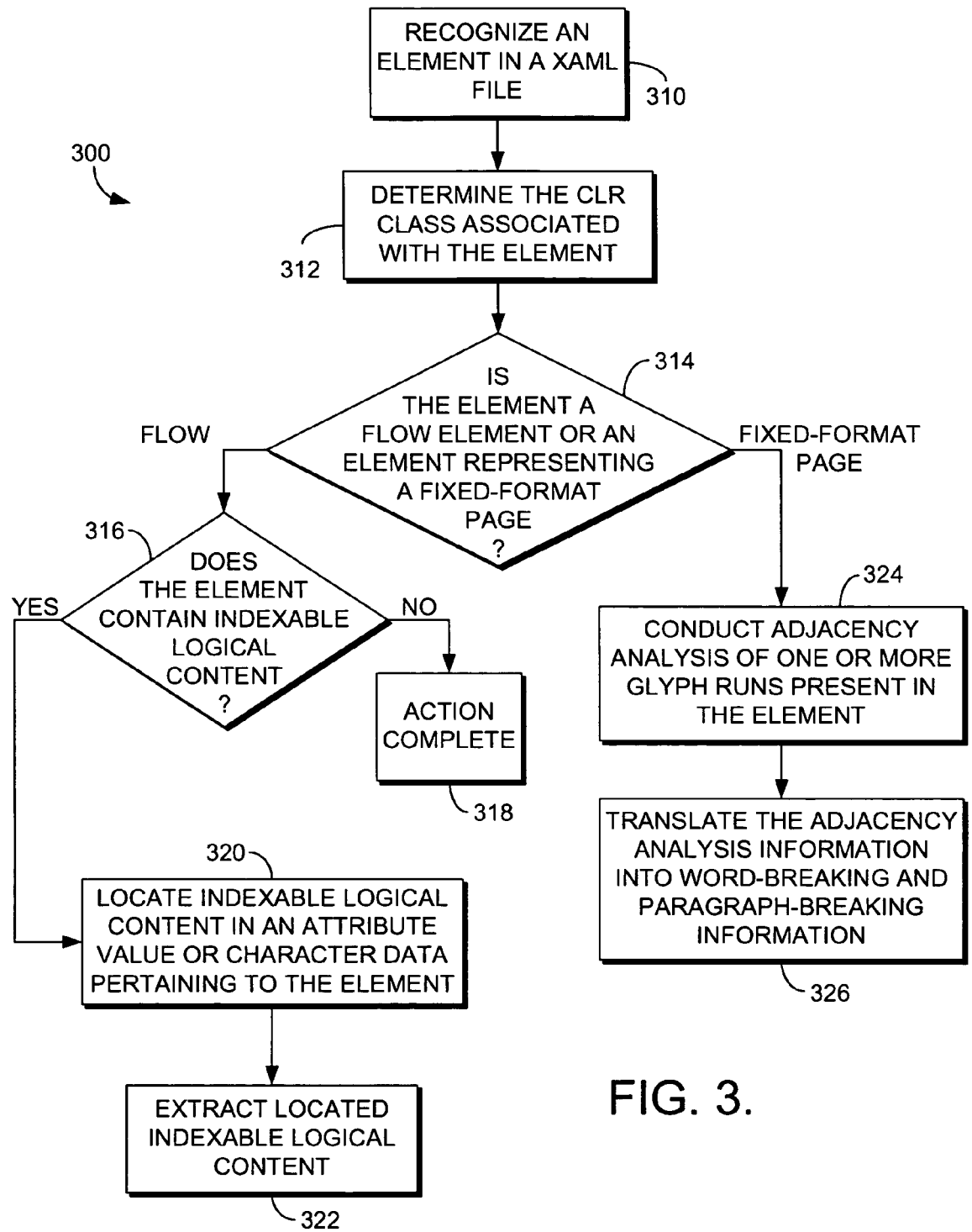
FIG. 3 is flow diagram showing a method for filtering an XAML file to facilitate indexing and/or searching of the indexable logical content contained therein in accordance with an embodiment of the present invention.

With reference now to FIG. 3, a flow diagram illustrating a method 300 for filtering an XAML file in accordance with an embodiment of the present invention is shown. Prior to initiation of the filtering method, an indication that the filtering process is to be initiated on a XAML file is received. This indication may be received upon enabling an underlying application (if the indexing services therefore are enabled) or upon initiation of a search for files containing particular content. Once such indication is received, the filtering process is initiated.

The filtering process may be described as a parsing process whereby the XAML filter (210 of FIG. 2) logs through the file to locate and extract the indexable logical content, that is, the textual content, thereof. Thus, upon initiation of the filtering method in accordance with an embodiment of the present invention, an element is initially recognized or identified in the XAML file being filtered. This is indicated at block 310. Subsequently, the CLR class associated with the element is determined, as indicated at block 312. As previously discussed, the determination of the CLR class is dependent upon the type of element identified. Thus, simultaneously or sequentially with determination of the CLR class, it is determined whether the element is a flow element (whether known or user-defined) or an element representing a fixed-format page. This is indicated at block 314.

If the element if a flow element, it is next determined whether or not the element contains indexable logical content, as indicated at block 316. There is no fixed schema in the sense of a XML schema for the flow-format elements in the XAML language, that is, there is no prescriptive schema that's going to exactly describe what the structure of the flow-format elements of an XAML file should be. However, the managed assembly in which the XAML is defined, e.g, WINFX available from Microsoft Corporation of Redmond, Wash., may be somewhat self-descriptive. That is, in the managed assembly, each class implementing a given XAML element is labeled with a .NET or a C# attribute that specifies information which does not change the behavior of the element but makes the element self-descriptive. As such, for each flow-format element encountered in a XAML file, there is an underlying code counterpart which specifies a CLR or object-oriented class which bears the same name as the element (e.g., inline, italic, paragraph, and the like). Accordingly, each of these classes is suitably annotated to express, among other things, whether the element contains indexable logical content and whether any indexable logical content is to be treated as inline or block. (For instance, a paragraph would be a block element delimited by carriage returns whereas an italic element will contain inline content to be inserted in a run-on fashion in the text of the rendered document).

Thus, the content-description attributes attached to a class will indicate whether there is indexable logical content at all, whether any indexable logical content is to be treated as inline or block, and in what property of the element the content is to be found. As such, the filtering methods described herein involve analyzing the underling code of the XAML file's implementation to determine where the content is to be located.

Referring back to FIG. 2, the table of XAML elements 220 initially contains information about known XAML elements. This information has been obtained through reflection on the XAML classes prior to the operation of the filter, i.e., at build time. Obtaining this information prior to build time saves the time and expense of utilizing reflection at run time. The information found in the table for each element indicates whether an element contains indexable logical content, in what property of the element the logical content is located, and whether the logical content is block or inline content. The flow element analyzer 214 looks up this table whenever it needs to determine the content characteristics of a flow element. Whenever an element is not found there, the flow element analyzer 214 uses the custom code locator 222 to access the corresponding CLR class. If the class is found, reflection is used to create a descriptor of the flow element just looked up and add it to the table.

Occasionally in an XAML file, an element may be encountered which contains logical content which is not indexable, that is, which is not capable of being indexed and/or searched. For instance, a resource element may be encountered which contains, for instance, definitions of shortcuts or data that may occur at a different location in the document but does not per se consist of any logical content. Additionally, there may be elements which describe how a document is to be processed and/or geometric elements that do not contain any indexable logical content. If it is determined that the element does not contain any indexable logical content, any action with respect to that element is complete, as indicated at block 318.

If, however, it is determined that the element does contain indexable logical content, the indexable logical content is subsequently located, as indicated at block 320. Information regarding whether a given element has indexable content and whether this content is inline (i.e., is to be glued to the surrounding content without intervening word breaks) is found in a dedicated attribute of the associated Common Language Runtime (CLR) class. Thus, if the element contains indexable logical content, that is, if the element contains logical content which is capable of being filtered for indexing and/or searching, the location of the indexable logical content is subsequently determined based upon the CLR or object-oriented class of the element.

Locating the indexable logical content of an element involves not only determining whether the element has any indexable logical content but also determining whether this content is stored in the children of the element or in a dedicated attribute and determining whether the element is preceded by a word break or the like. This involves a table (generated at build time) which maps all CLR classes to the content location information. As previously discussed with reference to FIG. 2, this table is built based upon information extracted by reflection from the classes that implement XAML elements. The reflection information that is used includes the presence of a layout attribute declared or inherited on the class. The layout property is one of block, inline, or inline-block. The last two values are to be considered as inline for the purpose of breaking words. Additional reflection information includes the presence of one of the public properties Text, Content, or TextContent. An element that admits a content-bearing property (i.e., Text, Content, or TextContent) has its content in this property if present in the markup. Otherwise, its content is present in its text children.

If the location of the indexable logical content is other than in the element itself, the location information may subsequently be stored and the filtering process continued until the location of the indexable logical content is encountered. Once the location of the indexable logical content is encountered (which may be the location of the element itself), the logical content of the element is extracted and returned to the environment, e.g., the search engine, as indicated at block 322. Once returned to the environment, the logical content may be indexed and/or searched as desired.

As will be understood by one of ordinary skill in the art, XAML files may contain tags or descriptive formatting codes that instruct the display of text and/or graphics. Typically, a tag will be associated with an element that, in addition to non-content, will sometimes have a property whose value is the element's textual content. In the XML realization of an XAML element, the value of such a property can be located either in an attribute value, a special element whose name is built from the property name, or the character data occurring directly in the element.

With reference back to block 314 of FIG. 3, if it is determined that the element is an element representing a fixed-format page, i.e., a glyph run, an adjacency analysis of the one or more glyph runs present in the element is subsequently conducted, as indicated at block 324. In the case of glyph runs, the XAML filter performs word break analysis on adjacent glyph runs, where "adjacent" refers to the physical order of glyph occurrences.

The logical content of glyph runs appears at least in an attribute which contains character codes and two-dimensional positioning data as well as in a separate attribute containing the textual content. Thus, the filter utilizes the textual content containing attribute to extract the indexable logical content of a glyph run.

The adjacency analysis involves translating individual glyph run properties into distance and colinearity information between logically consecutive glyph runs. The presence of two-dimensional data makes it possible to scramble glyph runs arbitrarily without affecting the markup semantics. However, most applications generate glyph runs in an essentially logical order making it practical to consider that two physically adjacent glyph runs are also logically adjacent. Determining adjacency between glyph runs consists of returning glyph runs in reading order and specifying whether each glyph run is separated from the next, and whether this separation is simple spacing or indicates that the two glyph runs belong to different paragraphs. (It should be noted that if adjacency analysis is not capable of being implemented at run time, each glyph run will be assumed to contain whole words.)

Subsequently or simultaneously, any language-dependent information in the glyph run is analyzed, as indicated at block 326. This involves translating the distance information obtained from the adjacency analysis into spacing markup, i.e., word-breaking and paragraph-breaking information.

Analysis of glyph runs provides the following information. First, the start- and end-point of its base line, to enable the inference of colinearity and relative order. These are given in page coordinates and take into account all transforms in scope. Secondly, the glyph run analysis provides the font rendering em size, which can be an indication of how much departure from exact colinearity can be accepted as well as how much distance should be interpreted as a word break. This is expressed as two real numbers in drawing surface units, a width size (parallel to the baseline) and a height size (perpendicular to the baseline) so as to take any applicable combination of scalings and rotations into account. Thirdly, the glyph run analysis provides a textual content string, which is a reliable indication of the character string represented by the glyph run. And fourthly, an indicator whether the direction of the language is right-to-left or left-to-right. If right-to-left, sorting is necessary for reconstructing the logical order Based upon the adjacency analysis and the language-dependent information (that is, the whole of the glyph run analysis), the indexable logical content of the glyph runs is subsequently extracted and returned to the environment, e.g., the search engine, for searching and/or indexing.

Some XAML files may contain both elements representing fixed-format pages and flow-format elements. Since there is no meaningful information to be derived from the physical contiguity of a flow element and an element representing a fixed-format page, the XAML filtering methods disclosed herein separate the two types of elements and filter them sequentially beginning with the elements representing fixed-format pages. That is, if a file contains both elements representing one or more fixed-format pages and flow-format elements, the element representing a particular fixed-format page will first be filtered without regard to the flow-format elements. Subsequently, after the fixed-format page has been filtered, the filtering process will start again at the beginning of the page and the flow-format elements will be processed.

The implementation of the methods herein described is incremental, returning one content "chunk" at time in document order. Once all content chunks have been returned to the environment (e.g., the search engine), the content thereof may be searchable and/or indexable as desired.

As can be understood, embodiments of the present invention provides methods for filtering a file written in Extensible Application Markup Language (XAML) and incrementally returning the logical content contained therein to the environment, e.g., a search engine. Embodiments of the present invention further provide methods for extracting indexable logical content contained in a XAML file to facilitate searching and/or indexing thereof.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for extracting indexable logical content contained in an Extensible Application Markup Language (XAML) file to facilitate indexing in a search engine, wherein the file contains user-defined elements and fixed-form page, the method comprising:

Identifying an element representing the fixed-format page in the XAML file;

Analyzing the element by conducting an adjacency analysis of one or more glyph runs present in the element to determine information regarding distance and colinearity between logically consecutive glyph runs, and analyzing language-dependent information to translate the distance and colinearity information into word-breaking and paragraph-breaking information;

Extracting the indexable logical content from the glyph runs based on the adjacency analysis and language-dependent information analysis;

identifying a user-defined format element in the XAML file, wherein the user-defined format element having code associated therewith;

analyzing the code associated with the user-defined format element to determine a Common Language Runtime (CLR) class; wherein the user-defined format element contains indexable logical content based upon one or more attributes of the determined CLR class;

locating the indexable logical content in at least one of an attribute value and character data pertaining to the user-defined format element;

extracting the located indexable logical content; and returning the extracted indexable logical content from the glyph runs and user-defined format to the search engine to facilitate indexing.

* * * * *